(12) United States Patent
Ackerman et al.

(10) Patent No.: US 7,966,495 B2
(45) Date of Patent: Jun. 21, 2011

(54) CONSERVING FILE SYSTEM WITH BACKUP AND VALIDATION

(75) Inventors: Steve F. Ackerman, San Antonio, TX (US); Scott L. Brown, Salt Lake City, UT (US); Christopher S. Hull, Salt Lake City, UT (US); Stephen D. Jones, Wanship, UT (US); Louis D. Langholtz, Park City, UT (US); Ryan Q. Stokes, Holladay, UT (US)

(73) Assignee: Revinetix, Inc., Salt Lake City, UT (US)

( * ) Notice: Subject to any disclaimer, the term of this patent is extended or adjusted under 35 U.S.C. 154(b) by 1485 days.

(21) Appl. No.: 11/385,976

(22) Filed: Mar. 21, 2006

(65) Prior Publication Data

US 2006/0259587 A1 Nov. 16, 2006

Related U.S. Application Data

(60) Provisional application No. 60/663,651, filed on Mar. 21, 2005, provisional application No. 60/663,829, filed on Mar. 21, 2005.

(51) Int. Cl.
*H04L 9/32* (2006.01)
(52) U.S. Cl. .......... 713/180; 713/168; 713/150; 705/69; 726/26; 726/27; 726/30
(58) Field of Classification Search .................. 713/180, 713/168, 150; 705/69; 726/27, 26, 30
See application file for complete search history.

(56) References Cited

U.S. PATENT DOCUMENTS

| | | | | |
|---|---|---|---|---|
| 6,804,356 | B1 * | 10/2004 | Krishnamachari | 380/201 |
| 6,931,549 | B1 * | 8/2005 | Ananda | 726/26 |
| 7,428,540 | B1 * | 9/2008 | Coates et al. | 1/1 |
| 7,600,108 | B2 * | 10/2009 | Gentles | 713/2 |
| 2002/0095579 | A1 * | 7/2002 | Yoshiura et al. | 713/176 |
| 2003/0105716 | A1 * | 6/2003 | Sutton et al. | 705/50 |
| 2005/0088680 | A1 * | 4/2005 | Ahn | 358/1.14 |

* cited by examiner

*Primary Examiner* — Christian LaForgia
*Assistant Examiner* — Roderick Tolentino
(74) *Attorney, Agent, or Firm* — Thorpe North & Western LLP (57) ABSTRACT

Disclosed herein is a hierarchical data storage and retrieval system implemented using a computed statistically unique signature for the content of given computer data as its basis. The data storage and retrieval system can be used to catalog computer information for easy indexing and retrieval. The signature is computed by any number of techniques so long as it is able to produce a statistically unique signature, one example being the SHA-1 algorithm. The system is able to reduce the amount of data that is stored and the time required for retrieving the data. Provide a way to move electronic data in an encrypted secure manner that requires the complete data set being moved for decryption of the data. Even if a portion of the data is compromised that portion would still remain secure. The data is encrypted and separated into two or more portions all of which would be needed to decrypt the data. Detailed information on various example embodiments of the inventions are provided in the Detailed Description below, and the inventions are defined by the appended claims.

4 Claims, 5 Drawing Sheets

| backup.gz.1 | backup.gz.2 |
|---|---|
| file_header XORandom-ized | file_header XORandom-ized |
| Key Information 1 | Chunk 1 |
| Chunk 2 | |
| | Key Information 2 |
| Key Information 3 | Chunk 3 |
| Chunk 4 | |
| | Key Information 4 |
| Key Information 5 | Chunk 5 |
| Chunk 6 | |
| | Key Information 6 |
| Key Information 7 | Chunk 7 |
| Chunk 8 | |
| | Key Information 8 |

Fig. 7

CONSERVING FILE SYSTEM WITH BACKUP AND VALIDATION

CROSS REFERENCE TO RELATED APPLICATIONS

This Application claims the benefit of the U.S. Provisional Application Nos. 60/663,651 and 60/663,829 both filed Mar. 21, 2005, which are hereby incorporated by reference each in its entirety.

BACKGROUND

Some of the inventions disclosed herein relate to the efficient storage, backup and validation of files using hash functions, while others relate to securing files through separation and encryption by parts.

BRIEF SUMMARY

Disclosed herein is a hierarchical data storage and retrieval system implemented using a computed statistically unique signature for the content of given computer data as its basis. The data storage and retrieval system can be used to catalog computer information for easy indexing and retrieval. The signature is computed by any number of techniques so long as it is able to produce a statistically unique signature, one example being the SHA-1 algorithm. The system is able to reduce the amount of data that is stored and the time required for retrieving the data. Provide a way to move electronic data in an encrypted secure manner that requires the complete data set being moved for decryption of the data. Even if a portion of the data is compromised that portion would still remain secure. The data is encrypted and separated into two or more portions all of which would be needed to decrypt the data. Detailed information on various example embodiments of the inventions are provided in the Detailed Description below, and the inventions are defined by the appended claims.

DETAILED DESCRIPTION

Using Statistically Unique Signatures for Hierarchical Data Storage and Retrieval
Example Implementation
The disclosed hierarchical storage system (HSS) is designed to enable faster storage, retrieval and archiving of data while reducing the space required to store, backup, arid archive data. Given that much computer data sets, or files, are exact duplicates of each other, a significant reduction in data storage requirements can be achieved by storing a single record of any given data set. In order to identify duplicate data sets, a statistically unique signature (SUS) is computed and compared against signatures of known data sets. Files are then used to refer to a data set at any particular place and time necessitating only one copy of a data set, eliminating duplicate data and reducing storage requirements.

Uses of the present embodiment include data file system, archival storage of digital data and to backup computers in a network. The hierarchical storage system could also be used for primary storage for a large dispersed storage network. The system can be applied to any data storage where the use of statistically unique signatures is appropriate, such as email files, health records, legal documents and other sensitive material.

Figure 1:
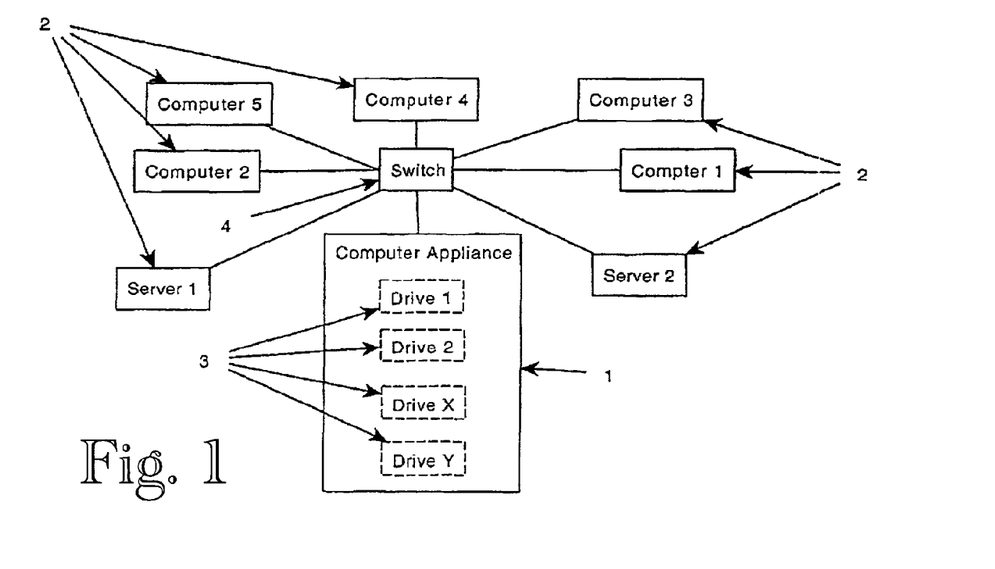
FIG. 1 is a block diagram of a computer network with a computer appliance and clients.

As illustrated in FIG. 1, an embodiment of the invention utilizes a computer appliance, 1 connected to a network, 4, with other computers, 2, who are clients of the computer appliance, 1. The computer appliance has a plurality of disk drives, 3, that are used to store data from the client computers. The data is stored on the computer appliance using the statistically unique signature, SUS, which is computed for each file stored.

Statistically Unique Signatures

The use of hash functions to digitally identify a block of computer data or individual files is a common practice. One well known method uses SHA-1 algorithm as described in "Applied Cryptography, Second Edition" by Bruce Schneier published in 1996 by John Wiley and Sons, pages 442-445 and implemented in RCF 3174. Using SHA-1 encryption on a file gives a SUS for that file. So any two files having the same SHA-1 signature will likely be identical files. Other algorithms such as MDS can be used to produce statistically unique signatures for computer files. Many of these are described in Mr. Bruce Schneier's cryptography book, "Applied Cryptography, Second Edition" copyright 1996.

Hierarchical Storage and Retrieval System

In the present embodiment the computer appliance, 1, is either connected directly to a client computer or across a network. The client contacts the computer appliance requesting to store a piece of data, included in the request is the SUS of that data. The computer appliance then checks to see if the SUS matches a SUS already on the computer appliance. If not the computer appliance will store the data using the HSS described below.

Figure 3:
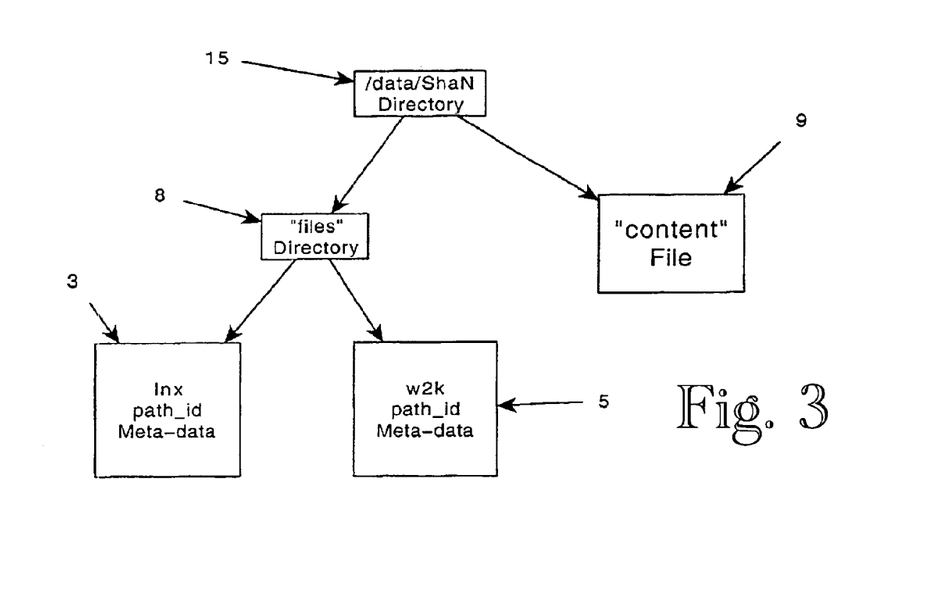
FIG. 3 is a block diagram example of file storage.

The HSS, FIG. 3, used to store and track the data has two top level directories, the "data" directory and the client or "catalog" directory. The data directory has a directory structure that at its end nodes contains a file specific to a file with a SUS, including the actual data contained in the file with the corresponding SUS, and another directory, file or files with the meta-data about that file. The catalog directory contains directories for each of the client computer or computers that the computer appliance has connected to it. In the catalog directory a duplicate file system for that client is built with files pertaining to the state of each file stored on the computer appliance. This enables a user to quickly find and access a file, set of files or directories.

Minimizing the space required to store content involves the use of both compression and in the present embodiment the use of message "signatures". Compression is commonly used to reduce the space required to store content's data. However, if the content is not unique, then a duplicate will exist. For example, if the first version of a file exists on a Windows client named "w2k" as "C:\L.arry\foo.doc" and an exact duplicate exists on a Linux,client named "lnx" as "/home/moelbar.doc", then the contents will be the same. The present embodiment computes a SUS for each file's content. This signature will be identical for identical files. Identical signatures are used to discover duplicate file contents and thus eliminate duplication.

The combined ability to retrieve file content with random access and to avoid duplication of file content using signatures distinguishes the file system from other conventional backup storage schemes.

Data Directory

Figure 2:
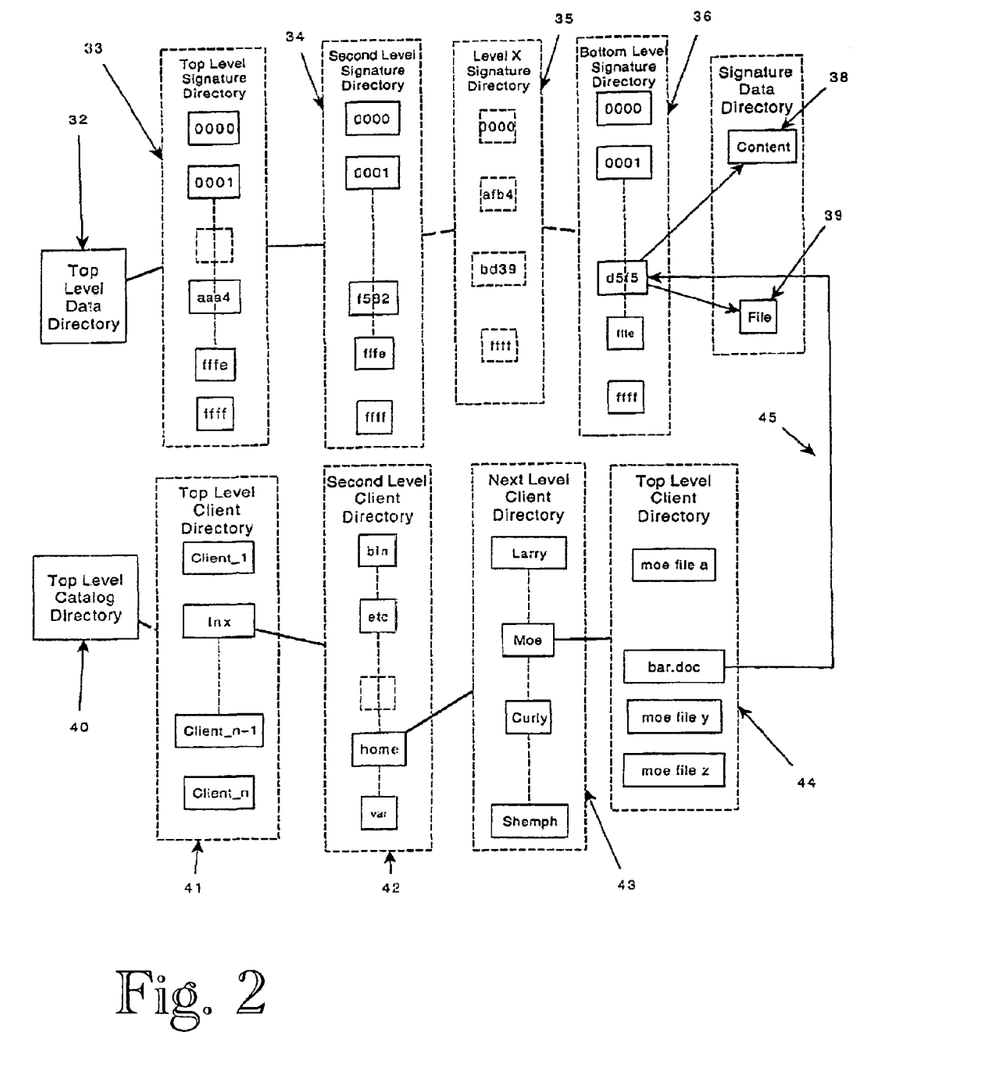
FIG. 2 is a block diagram example of the hierarchical storage system.

The data directory, 30, is located in the top level of the HSS as illustrated in FIG. 2. The data directory is built using the statistically unique signatures given to each unique file. The HSS uses a function such as SHA-1 cryptography to provide a SUS for each file. Each file that is stored has a place in the hierarchy according to this signature. In the present embodiment, the file system uses an existing file system structure such as XFS as the underlying structure and uses SHA-1 cryptography as the function to produce the SUS for each file. The hierarchy structure is built by breaking down the signatures into smaller pieces and making subdirectories, 33-36, of the smaller pieces. In the present embodiment the content of each file is stored in a directory named according to the content's SHA-1 signature, using 10 sets of 4 base-16 encoding characters. For example, if a file's SHA-1 signature, SUS in base-16, is:

aaa4f582c83d202aafb419a99626b255da4ad5f5

Then directories axe created as needed so a final directory structure with the SUS is made, such as:

/data/aaa4/f582jc83dj202a/afb4/19a9/9626fb255/da4a/d5f5

This directory will be referred to as /data/sha(docN) for each version N of the file, below.

The actual file content is then stored in a file named "content", 38. The computer appliance stores the original file contents from the client to the content file.

A "files" sub-directory aside the content file, 39, stores information about the file. The "files" sub-directory contains the given content's "place" and meta-data. The "place" being the particular set including the client, the path on that client, and the filename. This set of attributes identifies the place of the file. Allowable file and directory names on the computer appliance's file system may not be sufficient to represent each client file system's names, path names, or filenames. For example, on a Linux XFS file system 16 bit UNICODE directory or file names are not allowed while these are allowed on a MacOS X computer. For these files or directory paths to be recorded they must be recoded with a name the computer appliance can use. A number of recoding schemes are sufficient for this purpose, including relational database tables and LDAP directory entries. Below, the recoded identifier for client names, paths, and filenames are shown as client id(client), path_id(path), and filename id(filename), respectively.

Similarly, an observation time for the file is recorded, one method being the number of seconds since 00:30:00 1970-01-01 UTC. Using the example files above, at time 2005-01-05 09:00:00 MST, the "timestamp" files, in this case would both be named "1104940800". This "timestamp" file holds file attributes, including permissions, original place, and original file system specific meta-data. The meta-data can be a variety of data specific to the particular operating system or file system of the original file. The meta-data being the data associated with the file but not a part of it. Files created and stored under Novell Netware have different meta-data than files stored in Microsoft's Active Directory which has different meta-data from files stared on an Apple MacOS5 X.

Using the example above of the documents on "w2k" and "irix" above, in the /data/sha(docN) directory there would be the following descendants in the "files" sub-directory:

files/client_id(w2k)/path_id(C:\Larry)/filename-id(foo.doc)/1104940E00 and files/client_id(lnx)/path_id(/home/moe)/filename-id(bar.doc)/110494C800

Thus the place and observation time together identify a single file and its contents are identified by the SUS and contained in the "contents" file.

Client Directory/Catalog Generation

To enable a users to track their files without searching the entire data directory a "catalog" directory, 40, is maintained for each client. Since each client that attaches to the computer appliance can have different files and directory structures, the computer appliance must keep a record of each client and means to track and retrieve each client's files. This is done by building a directory or "catalog" with subdirectories corresponding to the directory structure on each client, 41-44. Associated with each file on the client is a link, 45, to the Sha-1 SUS in the data directory. By reading the link the contents of the associated file can be determined from the SUS. The directory holding these links is built as the data from the above described /data directory is built or written with the storage information.

The catalog should provide a view on all files of a client. The present embodiment uses a link structure form. Each client has a unique identifier such as its name, MAC address or serial number can serve as the base entry or client_id in the catalog directory under which the rest of that client's file structure is entered. As noted above some directory structures will need to be recoded so they can be entered on the computer appliance's file system. Taking the example for the files on the linux and the Windows 2000 machines we have:

/catalog/client_id(w2k)/path_id(C:\Larry)/filename id(foo.doc)

and:

/catalog/client_id(lnx)/path_id(Ihome/moe)/filename id(bar.doc)

Both of these are links back to the /data/Sha(docN)/ directory where the content file resides. Appending the same path as used in the catalog, ./client/path/filename, to the /data/sha (docN) directory names the attribute file that holds the meta-data associated with the particular client.

File Modification, Renaming and Deletion

Electronic data that is stored does not always remain static. Many files and data are modified, renamed, moved to another directory or deleted completely. The HSS must account for these changes to the data. For a file that is modified, the computer appliance must change the link in the catalog directory to point to the new SUS directory of the modified file. First the computer appliance checks to see if another SUS for the new, modified, file exists. If so the link in the catalog directory is changed from the old SUS data directory to point to the new SUS. At the same time the meta-data that is stored in the old SUS data directory is moved to the new SUS data directory pointed to by the catalog directory link. If a SUS for the new modification is not found the /data/shaN directory is created for the new SUS and the meta-data from the old SUS /data directory is moved to the new SUS directory. The old SUS /data directory is then checked to see if it can be deleted.

To see if the old SUS /data directory can be deleted the computer appliance checks one of the components of the old SUS /data/shaN directory its file count. This is the number of clients that have links to that specific directory and expect find its contents. If this number goes to zero the old SUS /data/shaN directory can be deleted.

Likewise for one client to delete a file, the computer appliance removes the meta-data for the file from the SUS /data/shaN/file directory for that client. It then also checks to see if the file count is zero and if the SUS /data/shaN directory can be entirely removed. The link in the catalog directory for the file is then removed to complete the deletion.

For renaming a file or directory the catalog file and/or directory must change to reflect the new name. For a directory this is simply renaming the path_id to reflect the new name. For a data set or file to change names, the file_id must change and this needs to be reflected in the SUS /data/shaN directory where the meta-data for the file is stored.

Backup and Archiving

Using the present embodiment for computer backup is described in this example implementation of the HSS. A computer appliance for backup is well known in computing environments and can be done in a number of ways; the computers can be backed up automatically according to a schedule or on demand. Software running on each computer client to be backed up has the ability to inspect the client's file system for modified files, to read files and file attributes, compress them, transport them over a network to the computer appliance, and a means to verify the transported data. Once the data is on the computer appliance the data is stored on a storage media such as digital tape or more recently on conventional computer hard drives. After the data has been backed up it is stored for a period of time and then is either removed to a secure sight for archiving or the data is erased by reusing the media on which it was stored.

Figure 4:
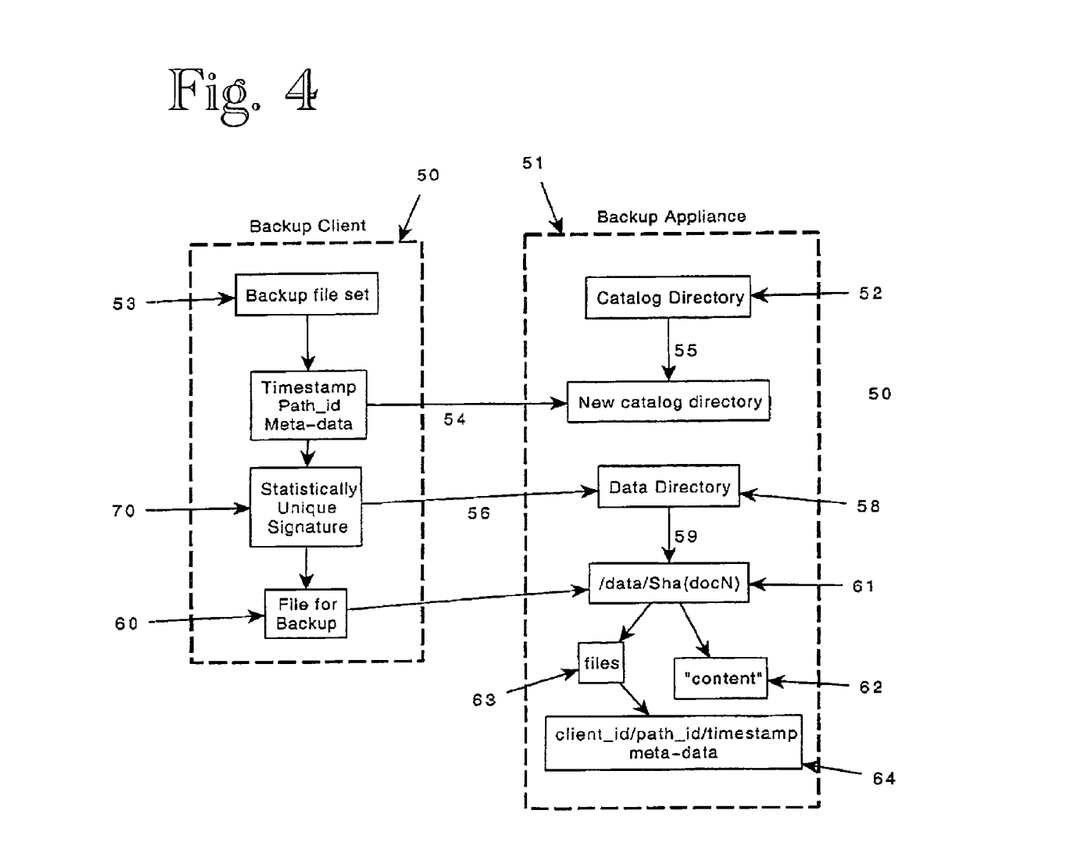
FIG. 4 is a block diagram example of file backup.

The backup process for each computer to an HSS appliance of the present embodiment would follow many of the conventional steps in present backup systems as shown in the block diagram of FIG. 4. Each client is contacted, 50, and if no backup has been performed on the client a complete backup is started. The computer appliance, 51, determines that the client has not been backed up previously and creates a directory in the catalog directory for the new client, 52. The computer appliance signals the client that it is to backup its designated files, 53. The client then checks the designated files to be backed up and sends the timestamp, path_id, file_id and meta-data to the computer appliance, 54, of the first file to be backed up. The computer appliance checks to make sure it has the proper catalog entries for the file including the path_id and creates them if they do not exist, 55. The client then computes the SUS, 70, for the file and sends it to the computer appliance, 56. The computer appliance then checks to see if it is a new file by checking against those files already backed up on the device in the data directory, 58.

Should the file not exist on the computer appliance the /data/ directory entry is created, 59, using the SHA-1 signature as described above. A copy of the file is then requested from the client, 60, and placed in the newly created directory, 61, in the "content" file, 62. The computer appliance, using the data that was originally sent by the client, makes the "files" directory, 63, in the /data/sha(docN) directory, 60, aside the content file. In the newly created files directory, the client information directory, 64, is created with all the original data sent by the client used to make the catalog entry.

If the file is not unique to the computer appliance, the computer appliance updates the information in the /data/sha (docN)/files directory, 63, with the information on the new client while still entering the data in appropriate catalog/ client directory.

The computer appliance now completes the process by making a link from the catalog directory timestamp entry for the newly backed up file to the /data/sha(docN) directory. Thus the backed up file is accessible both by the SUS and the catalog entry for the file.

The computer appliance and the client continue this process for each file that is to be backed up on the client. In this manner a complete set of files on the client machine is backed up with the information needed to recreate the client files for a particular time.

After a first complete or full save of a client computer is finished doing incremental backups for that computer happens in much the same manner. The client computer is contacted to backup the files selected for backup, 50. The client sends the path_id, file_id, timestamp and meta-data, 54. The computer appliance checks to see that the appropriate path and file exist and creates them if they do not, 55. The client computes a SHA-1 signature of each file's contents and sends the signatures to the computer appliance, 56, where the computer appliance determines whether or not the contents of the file are new by checking the SUS against the /data/shaN directories. If the file is a new file the computer appliance then creates the /data/shaX directory using the SUS as described above, 33-37. The content file is created, the file directory made and populated. The link is then set for the new file from the catalog directory to the /data/shaX directory.

The difference between the initial backup and the incremental backup comes in the handling of modified files. The modification results in a different SUS and therefore the link to the first /data/shaN directory is now invalid. Therefore a new link is required while preserving the old record of the initial file contents. This process is described below.

File Modification

When doing computer back up and especially for archival purposes it is necessary to keep track of different versions of a file. Therefore when a file is modified there must be a way to indicate that the prior content is no longer valid for the latest version of that file and what the previous version(s) of that file were. The SUS of each file prevents direct correlation between the modified files as each modification creates a separate, non-related signature. Therefore a method of tracking these changes is introduced with the present file system embodiment.

As described above the computer appliance notifies a client to backup a file set. The client produces the catalog entry information and sends it to the computer appliance, 54. The computer appliance checks to see that the catalog path and file exist. The client further sends the SUS for the file, 56, which the computer appliance checks against its /data/shaN directory to see if it already has a copy of the file. If so the computer appliance then checks to make sure the /catalog file entry and the SUS of the file are the same. If the signature and file entry correspond then the file has not changed. The computer appliance then checks the meta-data for any differences which are written out should there be a change in the meta-data. Otherwise the computer appliance moves on to the next file.

However, if the /data/sha(doc_Mod) directory does not exist or if the signature does not correspond to the /catalog file entry then the file has been modified and the modified file information must be updated.

To update the modified file information, the computer appliance creates the new /data/sha(doc_Mod) directory if it does not exist, 33-37. The content file is created and the files directory created and updated with the client data as described above for a new file. This includes building the files directory with the client directory and timestamp file:

/data/sha(doc_Mod)/files/client_id(w2k)/path_id(C:\Larry)/filename_id(foo.doc)/1104944400

The /catalog./client_id/path_id/file_id directory needs to reflect the modifications. Therefore another link is created using the new timestamp to the new /data/sha(doc_Mod) directory. In this way a record of the modifications is kept by each timestamp in the /catalog/client-id/path-id/file-id directory.

Another aspect of file modification is if a file were to be deleted. The client being backed up would not per se have a means to know when a file is deleted. Therefore during the backup process the computer appliance checks each directory in its /catalog/client_id to insure that all the known files in it have been backed up or are known to be excluded from the backup set. As the backup occurs should a file or directory be missed, the computer appliance checks the client for the file or directory. Upon receiving confirmation from the client that indeed the file or directory is missing the /catalog/ directory needs to be updated to reflect the deletion(s). This is done by placing a sentinel file with the timestamp and the 'deleted' suffix in the appropriate directory directories and file directory. For example the zero length file:

/catalog/client_id(w2k)/path_id(C:\Larry)/filename_id (foo.doc)/1049480 00.deleted would be created to indicate that the file had been deleted when the backup at time 11049480 was done.

File Restore

The reason behind computer backups is the ability to restore deleted or lost files. The file system of the present embodiment makes restoring a file, a set of files or entire clients a simple-process. A restore is begun by the user with the computer appliance. Two methods of file restoration are presented here. In the first method the user selects a client, 60, which was backed up whose file or files the user wishes to restore. The computer appliance then presents the top level directory structure from which the user either selects a directory or directories to restore or selects a directory to browse into. Should the user choose a directory to browse into the computer appliance presents the list of directories and files in the selected directory. The user can then again either choose to restore files or directories or move to another directory to browse. Once the user has selected the directories and files that are to be restored, the user notifies the computer appliance to begin the restore.

The computer appliance notifies the client computer using the client_id information that a restore is needed. Once the client has acknowledged the notification the computer appliance then proceeds to send the client the chosen directory and file information. The client checks to see that the directory or directories that are to be restored to exist and if not it creates them. The computer appliance finds the appropriate files by the latest timestamp in the files_id directory of each file that is to be restored. The computer appliance follows the timestamp link to the /data/shaN directory of each. The computer appliance then sends the corresponding "content" file for each restored file to the client which copies it into the directory identified by the path_id.

Should the user want to restore a particular file or set of files the user can look this file or files up specifically. The user can also choose a specific modification of the file based on the time of the backup by using the timestamp of the file link. Using the knowledge of which file and client the searches the catalog directory of the appropriate client and directory. The user simply follows the client, path, filename structure to the proper file name. The catalog directory file is then consulted to determine the proper revision of the file corresponding to the appropriate date the user wanted. The proper revision of the files corresponds to the appropriate SUS stored in the catalog file. The SUS is then read and the data directory consulted to find the correct file contents. The data associated with the SUS is then transferred to an appropriate place specified by the user. This can be to simply restore lost file or the file can be placed on another client or in another place on the original client. The file meta-data is also conveyed with the restored file to its original state. This process is followed for each file that the user wishes to recover from the computer appliance. It could be done for entire directories very quickly and efficiently or even for entire client machines.

There are also other advantages to the disclosed file system. The present disk-based HSS provides a manner to minimize space and being random-access, provides the ability to reconstruct a file set without time-consuming medium changing and completely without operator intervention. Because the content required for a file can be accessed without expensive media changing, content need not be duplicated solely for the purpose of quickly restoring a given file set. Instead, the content of any file in a file set is immediately retrievable.

Another Envisioned Embodiment

A hardware platform on which the HSS system could be implemented would be a storage area network or SAN. The HSS would be implemented by creating a top level structure in which the /data and /catalog directories are rooted. Each client computer connecting to the SAN would have a unique client identification or "client_id" as in the backup embodiment. Software directly on each client computer would then compute the SUS for a file to be saved. That would be checked for a copy already on the SAN and if so no new copy would he made but an entry in the /catalog file for the file to be saved would be entered and the appropriate link to the /data/shaN file would be made along with the entries in the file directory.

Several means for this would be to use a relational database to optimize the indexing and cataloging strategies. The use of LDAP directory optimizations, including mapping between paths and numeric ids is also contemplated. In conjunction with the LDAP optimizations the use of numeric ids for client names, paths, signatures, and filenames are also possible. Other possible embodiments include using an id for the entire place tuple, place_id(client,path,filename).

Another archival embodiment is to use the present invention to generate an archival disk or disks. The archival disk(s) would have a self contained file system of the present invention that would be able to hold an indeterminate number of backups from various clients. The ability to archive a large number of clients is enhanced by using the signature to archive only a single copy of duplicate files that are on many machines.

There are also optimization schemes for directory name encoding, including base-64 and the number of directory levels envisioned. Other optimizations include the structuring of the underlying file system itself to conform to the present embodiment and not use another localized file system such as XFS.

Other Statistically Unique Signature Embodiments

There are many well known hash algorithms that are used for computing checksums, message digests and statistically unique signatures. These hash algorithms can use a reversible algorithm or a one way algorithm. Since most applications for the present embodiment require data privacy, reversible algorithms are not listed though they could be used. The one way hash functions prevent the rebuilding of the data by being unable to reverse the algorithm.

Examples of one way hash functions include the SHA-N algorithms, SHA-1(SHA-160), SHA-193, SHA-224, SHA-256, SHA-384 or SHA-512 where the numeral corresponds to the number of bits that are produced by the function.

Several hash functions such as MD5, HAVAL and others are described in Bruce Schneier's book cited above. Any of these can be used so long as they produce a significantly large hash value.

Embodiment Variations for Other Purposes

Many other uses for the described file system are contemplated. Many analysis procedures can be developed using the embodied file system. These include isomorphic graph discovery, and data trends including client usage analysis. Two graphs are said to be isomorphic if they only differ in their labels. Thus using the present embodied file system on can discover if two clients have the same file structure and whether they differ only in name or other meta-data differences. This isomorphic graph discovery can be accomplished by building graphs of statistically unique signatures from two clients and comparing them. If they are identical then you have an isomorphic directory set. This can be very useful in reducing the amount of storage needed on a computer appliance by backing up the different labels and/or meta-data associated with each client's directory structure but not having to save the whole directory structure for each client.

The present file system can be used to track the trends in data usage by different clients with an addition of an extra file in the catalog directory. As the computer appliance backs up each client it would also keep track of the data size of each file that is backed up and write that information to a file in each level of the /catalog/client_id directories. The lowest level directory would have the data size information on the file that it is associated with and the directory above would have a file containing data on the size of all the files that are in that directory and data on the size of files in the directories below it. These data size files would be date stamped and compared for changes or trends over time.

Also virus scanning is one application in the various computer security applications of the embodied file system. A list of known viruses can be saved in a /catalog/virus directory and each virus' statistically unique signature can be saved in the data directory. Any new or modified file can be checked against the virus list and flagged should the statistically unique signatures match. Further it is contemplated that a lower level check for viruses of a new or modified file can be done. This would be done by a block level or even a byte level signature check of a file.

A computer security application for the present embodiment would be a file integrity validation. Computer system files that a hacker changes could be a disaster for an enterprise. Checking a computer's system files to insure they have not been changed can be done with the described embodiment by keeping a list of system files in the /catalog/client_id/system_files directory on the backup appliance of the present embodiment. The computer appliance then has the computer being checked provide the statistically unique signatures for each system file which then compared against the statistically unique signature of a known system file signature.

The ability to detect new, moved, copied, changed, or deleted files using the present embodiment can be used in a variety of ways for computer security. As mentioned above, virus detection would be one, and another would be the detection of modified system files. The system files for a computer do not usually change much if at all. Thus a change in one of these files would indicate a corrupted or hacked file. To check and fix any such corrupted or hacked files, the statistically unique signatures of a computer's system files would be kept on a read only media. These signatures are then checked against the signatures a client computer's system files during a backup or periodic check. Should any of the client computer's system files signatures sent during the backup not match the computer appliance's read only signatures the computer appliance would send an alert to the system administrator indicating a potential problem or break in.

Physical Implementations

There are several methods of physically implementing the above described HSS. The most straight forward means would be to write a software package that could be loaded onto a computer. The program would need to be compatible with the computer's operating system. The hardware could be more specialized with a separate FPGA of other silicon chip designed to handle the file system operations. Likewise the HSS could be implemented as a stand alone device that attached to a computer network. The other computers on the network could then attach to the HSS appliance to store there data.

Securely Store and Move Data Using Multiple Data Storage Devices

The present embodiment involves the use of multiple storage media used to securely move sensitive data to another location. Even should part of the data become compromised that data could not be read or deciphered by the compromising party without the entirety of the data. The present embodiment involves the encryption of data using the data itself and then placing the data on multiple storage media. By using the data itself for encryption and splitting of the data, the data can only be retrieved by having the complete set of storage media.

Figure 5:
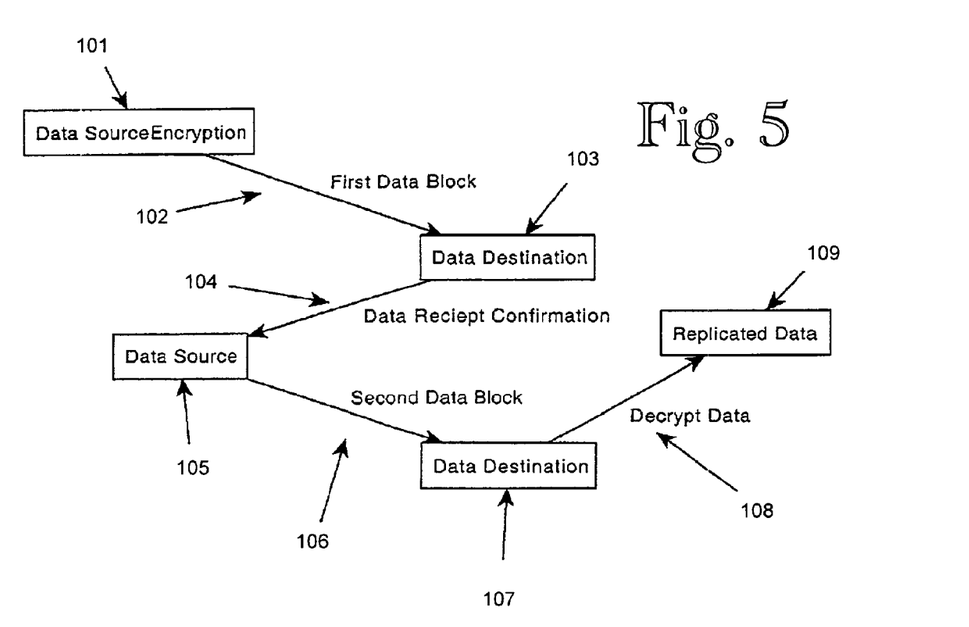
FIG. 5 is a block diagram of a data movement process.

In the present embodiment the data encryption uses properties of the data itself. The data is split into two or more pieces for encryption, encrypted using the two or more pieces of data and then each piece placed on two or more separate storage media such as two or more computer hard drives. To decrypt the data, access to all the physical media would be necessary due to the use of each part in the encryption process. Proper security protocols can then be used to insure that all the physical media are not susceptible to theft at any given time thus insuring the data is not compromised. For example shown in FIG. 5, the data source, 101, is encrypted according to the present embodiment. The encrypted data is then placed on two hard drives. A courier with the first hard drive, 102, is sent to the second destination, 103, for the data. When the courier returns, 104, unharmed with a verifiable receipt from the second destination, 105, second courier is sent out, 106, to the second destination with the second disk, 107. Only after the second courier arrives, 108, can the data be decrypted and used, 109.

XOR Random Encryption Key Algorithm

The present embodiment uses an exclusive or (XOR) coupled with a random number generator to encrypt the data. The following is true about the XOR operation: if $a\hat{\ }b=c$, then $b\hat{\ }a=c$, and $a\hat{\ }c=b$. Further more, if $a\hat{\ }b\hat{\ }c\hat{\ }d=e$, then $a\hat{\ }b\hat{\ }c\hat{\ }e=d$, etc. Using these properties the following algorithm is used to encrypt the data.

Figure 6:
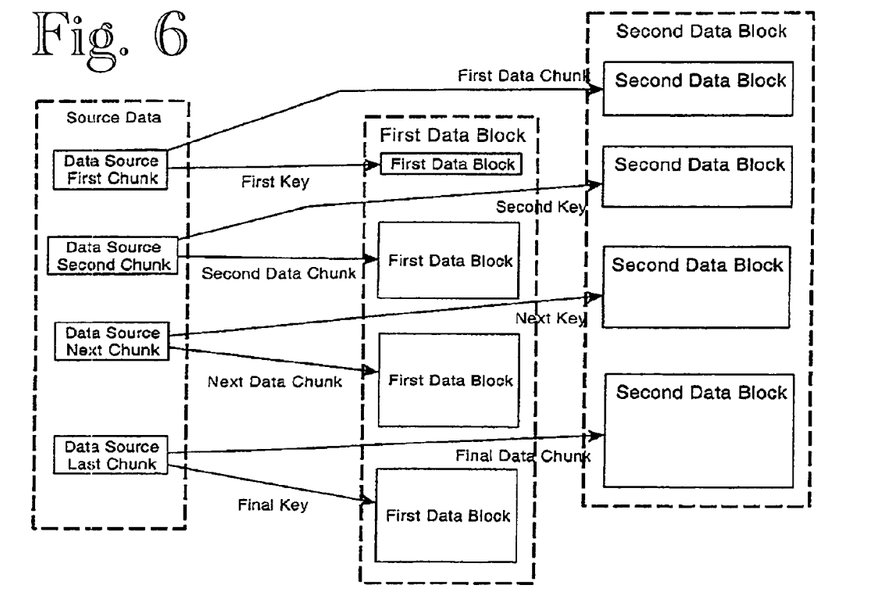
FIG. 6 is a block diagram of a XOR encryption process.

First the data to be encrypted is split into two or more parts, data block 1 and data block 2 for example, as illustrated in FIG. 6. A piece of the first data block is XOR'd with a random number and saved as the first part of encrypted data are then generated and XOR'd with the original data. For example, take the string "Test", and 4 random numbers, Rand1, Rand2, Rand3, and Rand4. Take the first "chunk" of data, in this case the "T", XOR it with the first random number, Rand1, and randomly put it in the second data block, Data Block 2. Take the second. "chunk" of data, the "e", XOR it with Rand2 and randomly put it in Data Block 1. The entire original data is encrypted following this process for each "chunk" of data, in this case the string "Test" is the data and. each "chunk" is a letter as shown in the following table:

| Source Data | Data Block 1 | Data Block 2 |
| --- | --- | --- |
| T | Rand1 | Rand1$\hat{\ }$T |
| E | Rand2$\hat{\ }$e | Rand2 |
| S | Rand3$\hat{\ }$s | Rand3 |
| T | Rand4 | Rand4$\hat{\ }$t |

To decrypt the data one only needs to know the size of the data chunk and random number. A chunk of data, the size of the data chunk and random number, is read off each of the data blocks and XORed, as in the above example, Rand1^(Rand1^T) give us "T". This process is done for chunks of data for each of the data blocks until each data block is read in its entirety and the source data is replicated.

The present embodiment contemplates the use of more than two data blocks for securing the data. Should one want or need to break the data into more than two data blocks as previously described the data can be broken into any number, N, data blocks. Again using the properties of an XOR, the source data is broken into N data blocks where the first "chunk" of data is XORed with a random number and all the N random numbers generated for the first chunk of data. This encrypted chunk is put in a data block and the other random number put in their respective data blocks. The next chunk is then XORed with a random number and placed in a random data block with the rest of the random numbers placed in their respective data blocks. This is continued for the entire source data with all the chunks being XORed with a random number and appended to a random data chunk. The following table shows this process using the "Test" case as in the table above:

| Source Data | Data Block 1 | Data Block X | Data Block N |
|---|---|---|---|
| T | Rand1 | RandX | T^Rand1 ... ^RandN |
| E | E^Rand(N + 1) ... ^Rand(2N) | RandN + X | Rand(2N) |
| S | Rand(2N + 1) | s^Rand(2N + 1)^ ... ^Rand(3N) | Rand(3N) |
| T | Rand(3N + 1) | t^Rand(3N + 1)^ ... ^Rand(4N) | Rand(4N) |

To decrypt the data and return a copy of the original source data requires the entire set of data blocks, the length of each data chunk and the knowledge of the length of the random numbers, RandN. By using this information each data block is systematically read for the first data chunk and the XOR process is performed on the N chunks of data, the result being the first decrypted chunk of source data. This operation is performed for each chunk of each data block until the entire source data is reproduced.

Essentially, we've created a one-time pad with the same length as the data. Brute force cracking methods will not work in decrypting the data. The only vulnerability to this method is if the random number algorithm can be predicted.

The above described embodiment could be used exclusively to securely offsite data, but would be expensive in terms of storage space, and write time. To reduce the amount of time needed to encrypt the data and the amount of storage space needed to write the encrypted data a second embodiment is disclosed as a means to minimize wasted storage space.

The second embodiment uses the principles of the first including an initial random number or key size, an initial size for a chunk of data to be encrypted and the number of blocks the source data will be broken into. A file header is then created for each of the data blocks the source will be broken into. The file headers are created using random numbers, one for each of the data blocks to be created, the initial key size, the initial data chunk size, the initial data block for the initial key and the initial data block for the initial chunk. A random number is assigned for each of the new data blocks and one of the data blocks is randomly selected to be XORed with the initial data of key size, data chunk size, initial key block and initial chunk block. This information, the randomt number or the XORed randomized information, is placed as the header onto each corresponding data block.

A random number key of the initial key length is then generated and XORed with a chunk of source data the size of the initial chunk. This randomized data chunk is then appended to the initial data block in the header. A new key size, chunk size, key block and data block are chosen. This information is appended to the initial key and this entire, key block is appended to the initial key data block. The sequence is then started over. A new key of the new key length is generated and XORed with a chunk of source data of the new chunk length. This is appended to the new chunk data block. A new key length, chunk size, key block and data block are selected; the information appended to the key and this is appended to the key data block. This process is repeated until the entire source data is encrypted and divided onto the various data blocks along with the key information.

The file header portion of the second embodiment can use either block or stream cipher methods to encrypt the header portion. The block cipher method using a single block key matching the length of the data to be encrypted. The streaming method uses a key that is not as long as the data to be encrypted. Instead the key is used repeatedly on a portion of the data until the entire data is encrypted.

Figure 7:
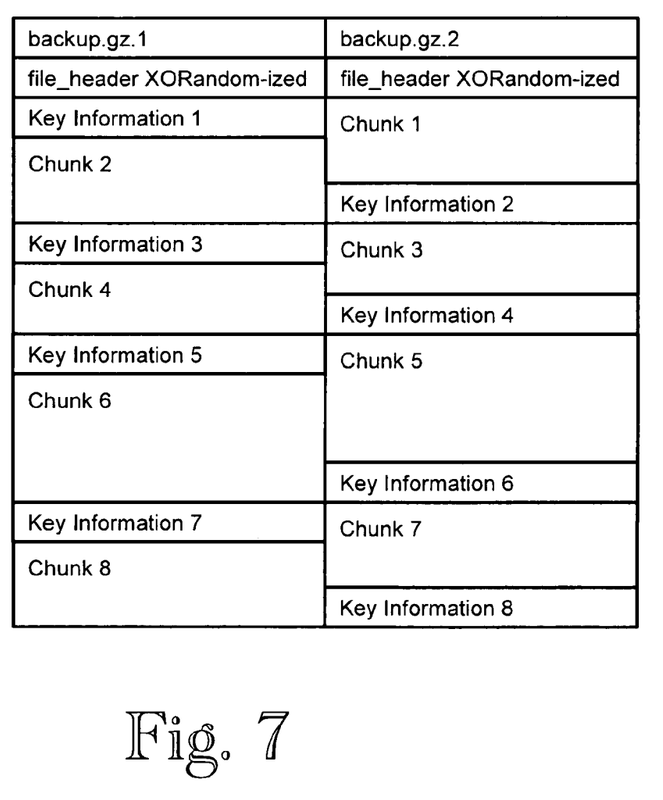
FIG. 7 is an example table diagram of a XOR encryption process.

Shown in FIG. 7 is a simple version of the second embodiment using only 2 data blocks and alternating the key and chunk information.

Decrypting the data blocks and assembling a duplicate of the source data is done by reading and doing an XOR of the header information on all the data blocks. This gives the initial key size, initial chunk size, initial key data block and initial chunk data block from which to read. The key and chunk information is read from the data blocks determined by decrypting the header information. This is then decrypted with the key and the process is repeated until all the chunks from all the data blocks have been read and decrypted thus producing the source data.

As the key size approaches the chunk size, the ability to even break the encryption on a single chunk approaches impossible. Impossible meaning that it could not be cracked in an infinite amount of time.

Other Encryption Methods

In place of the XOR algorithm, any number of symmetric key algorithms can be used. A symmetric key algorithm is an encryption algorithm that uses a single for both encrypting and decrypting the data. Though the XOR algorithm is one of the simplest symmetric key algorithms it is not the only method available to encrypt data to be moved using the multiple storage media described above. Some of the most well known algorithms include: DES, 3-DES (triple DES), RCS, Blowfish and AES (Advanced Encryption Standard).

Methods of Implementing the Media Movement Method

The present encryption and movement method described above can be accomplished in a variety of ways. The use of a stand alone software program on a computer can be easily implemented. The software would be coded to take input data, encrypt it in the above described manner and then place the encrypted data into several files. These files would then be copied onto separate removable media such as magnetic tape or removable hard drives. Another means to implement the encryption scheme would be to have a separate processor that is designed to implement the encryption algorithm placed in a computer and further programmed to send the input data to different removable media attached to the computer. This can be accomplished with either an FPGA or specially designed silicon chip. All of the above described implementations can be realized as a stand alone device that takes input from a source, such as an attached hard drive, removable media or computer network.

While various data storage and retrieval systems utilizing statistically unique signatures and methods of encrypting and securing data requiring a complete data set to decrypt have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed:

1. A hierarchical data storage and retrieval system for reducing the amount of stored data and retrieval time, comprising: a processor; data and program storage accessible by said processor, said storage comprising one or more data storage devices; and computer readable instructions located to said program storage, wherein said instructions are configured to be executed by said processor to perform the functions of:
   (i) receiving a request to store a piece of data, wherein the request includes a file name,
   (ii) for the received request to store the piece of data, computing a signature for a content of the piece of data, wherein the signature is substantially statistically unique for the piece of data,
   (iii) checking for an existence of the computed signature on the data storage and retrieval system that corresponds to an identical piece of data stored to said data storage, wherein the computed signature for the identical piece of data stored is identical to the computed signature for the piece of data in the request,
   (iv) segmenting the computed signature into a plurality of signature segments used to catalog the content of the piece of data in a hierarchal directory,
   (v) if in said checking the existence of the computed signature is not found, storing the piece of data associated with the received request to said data storage addressable by the computed signature, and further cataloging the piece of data associated with the received request by the file name and assigning to a counter a count corresponding to one instance of the piece of data associated with the received request,
   (vi) if in said checking the existence of the computed signature is found, cataloging an existing piece of data stored to said data storage, if one exists, and incrementing the counter storing an instance count,
   (vii) receiving a request to modify or delete a stored piece of data, the request including a file name,
   (viii) for the received request to modify or delete the stored piece of data, identifying the stored piece of data cataloged by the received file name,
   (ix) for the identified stored piece of data, decrementing the counter storing the instance count, and
   (x) if in said decrementing the counter indicates zero instances of the identified stored piece of data, deleting the identified stored piece of data from the data storage and retrieval system and its corresponding catalog entry.

2. The hierarchical data storage and retrieval system of claim 1, wherein the plurality of signature segments are used to generate subdirectories to catalog the content of the piece of data.

3. The hierarchical data storage and retrieval system of claim 1, further comprising storing the content of the piece of data separately from the file name, a file path, a client name, client id, data and time information, or meta-data in the request.

4. The hierarchical data storage and retrieval system of claim 1, wherein the content of the piece of data used to compute the computed signature is separate from the file name, a file path, a client name, client id, data and time information, and meta-data in the request.

* * * * *